United States Patent [19]

Alfenaar

[11] Patent Number: 4,605,601

[45] Date of Patent: Aug. 12, 1986

[54] METHOD OF OPERATION OF A FUEL CELL

[75] Inventor: Marinus Alfenaar, Schinnen, Netherlands

[73] Assignee: Electrochemische Energieconversie N.V., Mol, Belgium

[21] Appl. No.: 690,622

[22] Filed: Jan. 11, 1985

[30] Foreign Application Priority Data

Jan. 14, 1984 [NL] Netherlands ............... 8400128

[51] Int. Cl.$^4$ ............... H01M 8/24
[52] U.S. Cl. ............... 429/13; 429/18
[58] Field of Search ............... 429/12, 13, 14, 15, 429/16, 17, 18, 19, 21, 22, 48, 52

[56] References Cited

U.S. PATENT DOCUMENTS 3,395,045 7/1968 Ruetschi ............... 429/13
3,791,870 4/1970 Grune .
4,233,371 11/1980 Dorrestijn ............... 429/152

Primary Examiner—Donald L. Walton
Attorney, Agent, or Firm—Cushman, Darby & Cushman

[57] ABSTRACT

Present invention relates to a method of operation of a fuel cell, in which method the fuel cell is operated so that a stoechiometric excess amount of fuel is present at the anode relative to the amount of oxidant in the cathode chamber(s), in which method the anode is connected with the cathode within the fuel cell through one or more electrical conductors, the arithmetic product of the total electrical resistance between the anode and the cathode electrically conductive connected therewith within the fuel cell in $\Omega$ and the active area of the cathode in $m^2$ lying between $10^{-4}$ and 10 $\Omega m^2$, and in which method subsequently the external current drain is stopped and also the oxidant supply at least virtually is stopped, one or more electrically conductive connections being maintained between the anode and the cathode within the fuel cell after the external current drain from this fuel cell having been stopped and also the anode chamber(s) being left filled with fuel.

6 Claims, 1 Drawing Figure

METHOD OF OPERATION OF A FUEL CELL

FIELD OF THE INVENTION

The present invention relates to a method for operation of a fuel cell.

SUMMARY OF THE INVENTION

The present invention relates to a method of operation of a fuel cell to supply current to an apparatus. In the method, the fuel cell is operated so that a stoichiometric excess amount of fuel is present at the anode relative to the amount of oxidant at the cathode chamber or chambers. In the method, the anode is connected with the cathode within the fuel cell through one or more electrical conductors. The arithmetic product of the total electrical resistance between the anode the cathode which are electrically conducted therewith within the fuel cell in $\Omega$ in the active area the cathode being measured in $m^2$ ranges between $10^{-4}$ and $10\ \Omega m^2$. In the method, subsequently the external current drain is stopped and also the oxidant supply is at least virtually stopped. One or more electrically conductive connections are maintained between the anode and the cathode within the fuel cell after the external current drain from the fuel cell has been stopped and also the anode chamber or chambers are left filled with fuel.

DETAILED DESCRIPTION OF THE INVENTION

Figure 1:
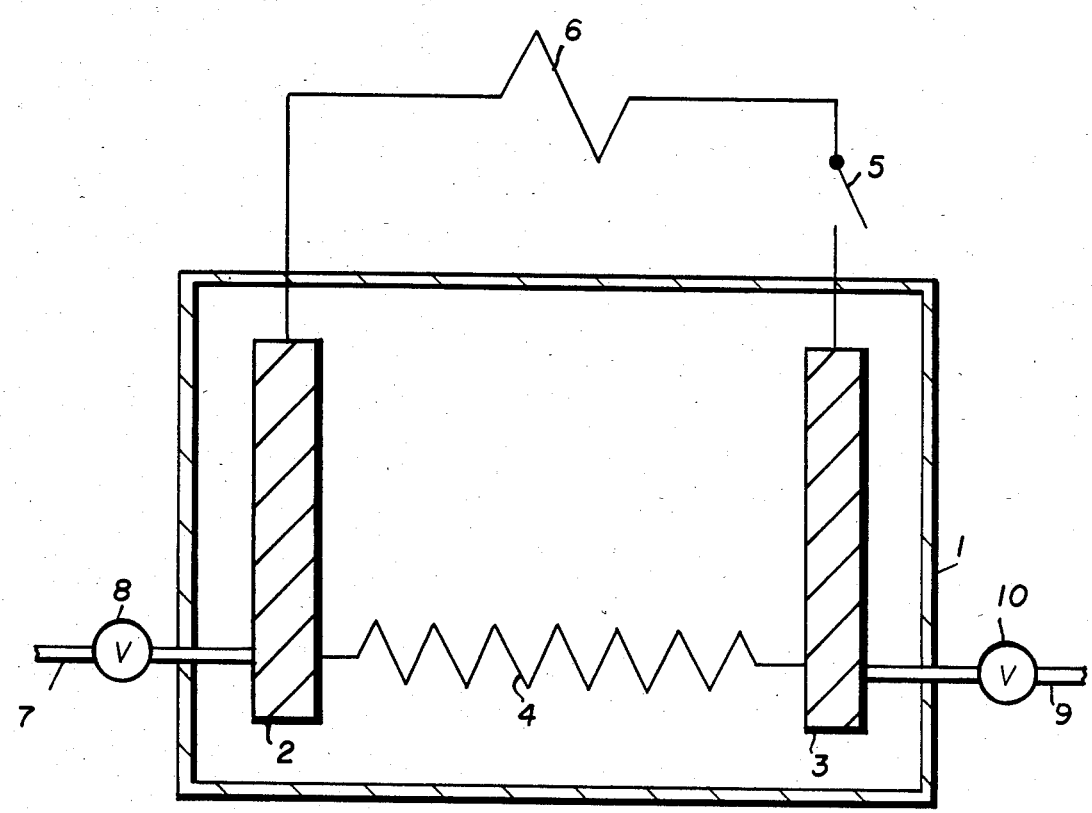
FIG. 1 illustrates a fuel cell embodiment according to the present invention.

The present invention relates to a method of operating a fuel cell wherein the fuel cell 1 is operated so that a stoichiometric excess amount of fuel is present at the anode relative to the amount of oxidant in the cathode chamber(s), in that the anode 3 is connected with the cathode 2 within the fuel cell through one or more electrical conductors 4, the arithmetic product of the total electrical resistance between this anode and the cathode electrically conductive connected therewith within the fuel cell in $\Omega$ and the active area of the cathode in $m^2$ lying between $10^{-4}$ and $10\ \Omega m^2$, advantageously between $10^{-3}$ and $5\ \Omega m^2$, and in that subsequently the external current drain 6 is stopped by using switch 5 and also the oxidant supply at least virtually is stopped, one or more electrically conductive connections being maintained between the anode and the cathode within the fuel cell after the external current drain from this fuel cell having been stopped and also the anode chamber(s) being left filled with fuel. The anode may be composed of a plurality of electrically conductive interconnected part anodes.

The cathode is composed of a plurality of electrically conductive interconnected part cathodes.

The electrically conductive connection between the anode and the cathode in this fuel cell may be embodied in a variety of fashions. Suitable exemplary means include using a spacer of sufficiently electrically conductive material between the anode and the cathode, and/or using one or more electrically conductive wires between the anode and the cathode, and/or using a plurality of contact points between the anode and the cathode, preferably distributed on the surface, and/or using a frame in which the, preferably flat, electrodes are embedded, the frame consists of sufficiently electrically conductive material, preferably electrically conductive plastic, such as for instance plastic incorporating a suitable number of carbon particles and/or metal particles, the anode and cathode frames whithin a fuel cell are electrically conductively connected with one another, for instance, by being in direct contact with one another, for instance, through welds or through an electrically conductive bonding agent such as a metal powder-containing epoxy glue.

Flat electrodes embedded in a frame consisting wholly or largely of plastic are described in Canadian Pat. No. 1,129,996, which for the sake of brevity is referred to for a more elaborate description of these electrodes. Flat electrodes embedded and/or encapsulated in a thermosetting synthetic resin are described in U.S. Pat. No. 4,048,386 and U.S. Pat. No. 4,233,371, which for the sake of brevity are referred to for a more elaborate description of these electrodes.

The advantage of the method according to the invention lies in the profound improvement of the stability of fuel cells operated according to the invention in comparison with the same fuel cells that are operated without application of the method according to the invention.

Advantageously, hydrogen is used as fuel and oxygen as oxidant, advantageously in the form of an oxygen-containing gas, such as air, air enriched with oxygen or air diluted with one or more inert gases such as nitrogen and the noble gases. Fuel is supplied to cell 1 through supply pipe 9 which is controlled by valve 10. The oxident is supplied to fuel cell 1 by supply pipe 7 which is controlled by valve 8.

The invention is further elucidated with the following example and the comparative experiment.

EXAMPLE I

A battery of 576 fuel cells was installed as a power source for an electric vehicle. Each cell consisted of a flat anode with an active area of 0.03 $m^2$ and a flat cathode with an active area of 0.03 $m^2$. The anode and cathode were both embedded in a frame consisting of a plastic that has been made electrically conductive by means of carbon particles, which frames were welded together. The electrical resistance between the anode and the cathode within one cell amounted to approx. 50 $\Omega$.

In new condition each cell delivered 20.8 Watts on average at a cell voltage of 670 mVolts.

During a prolonged testing period the battery was regularly started up, the battery supplied current, it being seen to that a stoichiometric excess amount of fuel was present at the anode(s) relative to the amount of oxidant in the cathode chamber(s), and the battery was taken out of operation by stopping an external current drain and the air supply, the anode chambers being left filled with fuel. The cells were constructed so that an electrically conductive connection continued to exist between the anodes and the cathodes within the several cells. Hydrogen was applied as fuel and oxygen in the form of air as oxidant.

The battery was tested again after 11½ months. Now, each cell delivered 19.0 Watts on average at a cell voltage of 670 mVolts. The performance of the battery had hardly diminished after almost 1 year.

COMPARATIVE EXPERIMENT A

A battery of 360 fuel cells was installed as a power source for an electric vehicle. Each cell consisted of a same type of anode and a same type of cathode as in Example I. The anode and the cathode within one cell were now electrically insulated from one another. The electrical resistance between this anode and cathode amounted to more than $10^6$ Ω.

In new condition each cell delivered 22.0 Watts on average at a cell voltage of 670 mVolts.

During a test period the battery was started up several times and taken out of operation by stopping the hydrogen supply and the air supply and subsequently flushing the hydrogen circuits with nitrogen and allowing the battery to cool down. The test had to be abandoned after 8 weeks because the performance of the battery of fuel cells had diminished too much.

After these 8 weeks the battery was tested again. Now, each cell delivered only 10 Watts on average at a cell voltage of 670 mVolts.

I claim:

1. A method of operating a fuel cell, said fuel cell having an anode and a cathode and at least one anode chamber and at least one cathode chamber, said anode being electrically connected with said cathode within said fuel cell through at least one electrical conductor, said fuel cell providing power to an external current driven source, wherein said method comprises:
   supplying fuel and oxidant to said fuel cell;
   providing a stoichiometric excess amount of fuel at said anode relative to the amount of oxidant in a cathode chamber;
   subsequently at least virtually stopping the supply of oxidant to said fuel cell and stopping the drain of current by said external current drain source such that said anode chamber is left filled with fuel; and
   maintaining at least one electrically conductive connection between said anode and said cathode after the external current drain from said fuel cell has been stopped,
   maintaining, during said process after said current drain from said fuel cell to said external current driven source has been stopped and the supply of said oxidant is also stopped, at least one said electrical connection between said anode and said cathode within said fuel cell such that the arithmetic product of the total electrical resistance between said anode and said cathode electrically conductively connected together within said fuel cell, in Ω and the active surface area of said cathode in m$^2$, ranges between $10^{-4}$ Ωm$^2$ al 10 Ωm$^2$.

2. Method according to claim 1, wherein said arithmetic product lies between $10^{-3}$ and 5 Ωm$^2$.

3. Method according to claim 1, wherein hydrogen is used as the fuel.

4. Method according to claim 1, wherein oxygen is used as oxidant.

5. Method according to claim 1, wherein said electrical conductor comprises electrically conductive plastic frames for, respectively, the anode and cathode, said frames being electrically conductively connected together.

6. Method according to claim 5, wherein hydrogen is used as the fuel and an oxygen-containing gas is used as the oxidant.

* * * * *